Figure 1:
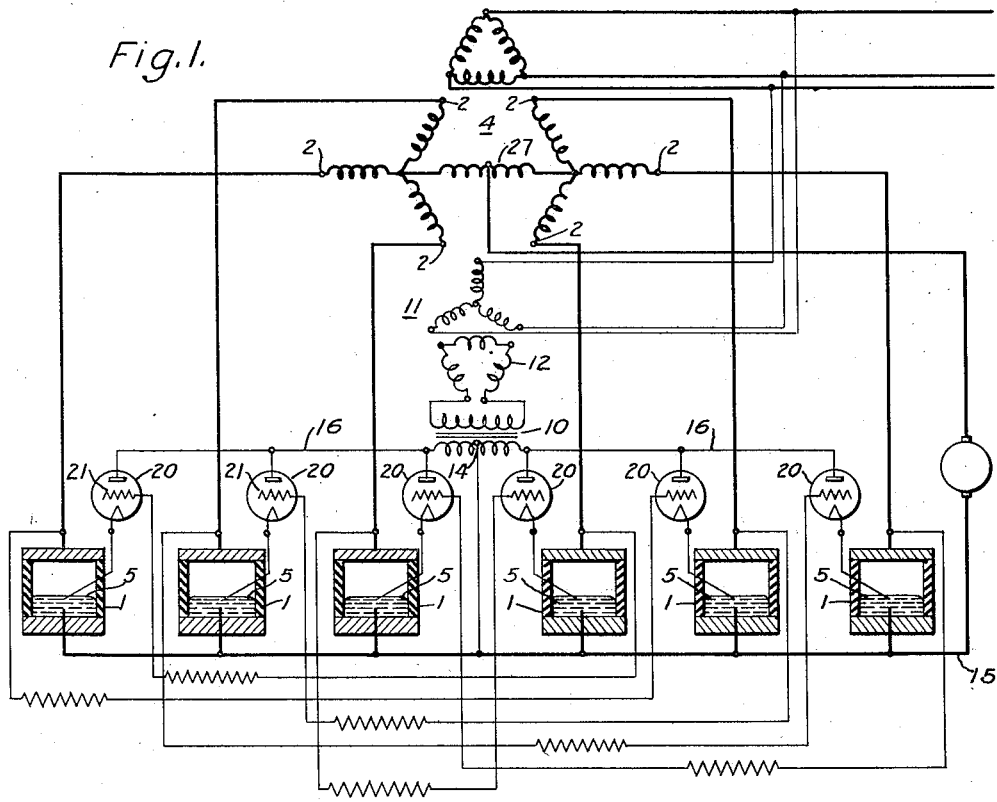

Sept. 24, 1935.  D. SILVERMAN ET AL  2,015,538
VAPOR ELECTRIC CONVERTER
Filed March 29, 1934   2 Sheets-Sheet 2
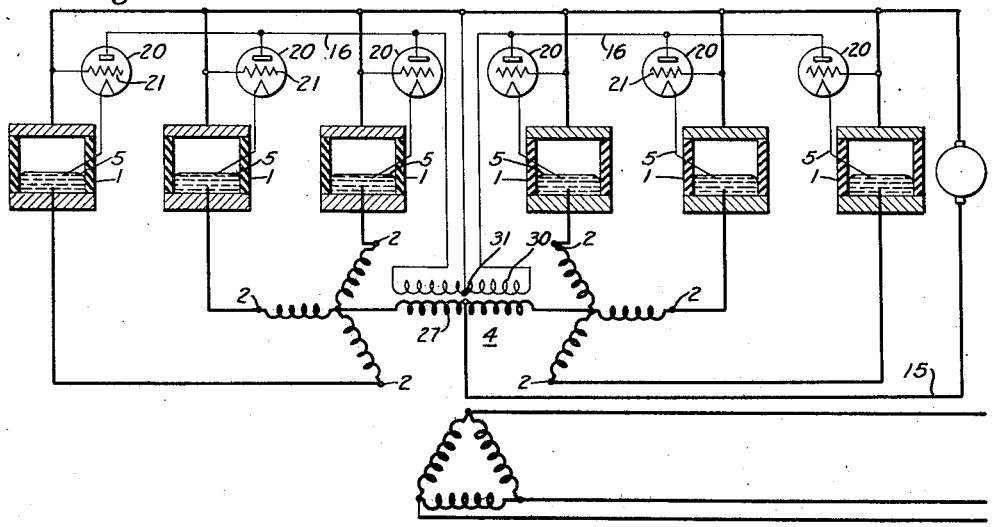
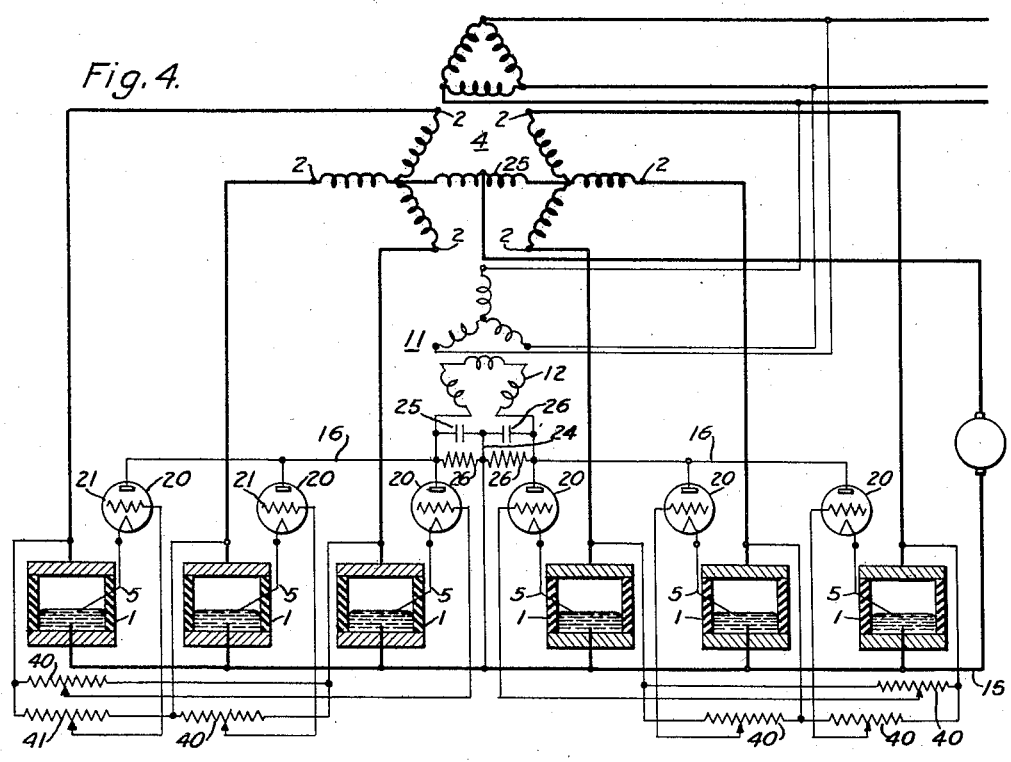
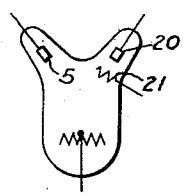
WITNESSES:
INVENTORS
Daniel Silverman &
Leon R. Ludwig
BY
O. B. Buchanan
ATTORNEY Patented Sept. 24, 1935

2,015,538

UNITED STATES PATENT OFFICE 2,015,538

VAPOR ELECTRIC CONVERTER

Daniel Silverman, Wilkinsburg, and Leon R. Ludwig, Forest Hills, Pa., assignors to Westinghouse Electric & Manufacturing Company, East Pittsburgh, Pa., a corporation of Pennsylvania Application March 29, 1934, Serial No. 718,096

10 Claims. (Cl. 175—363)

Our invention relates to a vapor electric converter and particularly to an excitation system for supplying current to the make-alive electrodes of a make-alive type of converter.

In the operation of make-alive type converters, that is, a converter in which a make-alive electrode is utilized to create a new cathode spot at each conducting half cycle, trouble has been experienced in terminating the flow of make-alive current after the creation of the cathode spot.

When the make-alive electrode is energized directly from the anode with which it is associated the make-alive electrode is not energized until the potential of the anode has increased sufficiently to cause current flow in the make-alive circuit thus introducing an undesirable delay in the picking of the main electrode.

It is accordingly an object of our invention to provide an excitation system in which the make-alive current will flow for a relatively short period of time.

It is a further object of our invention to so adjust the time of the make-alive impulse that the cathode spot will be formed early in the conducting period of the make-alive converter.

According to our invention, these objects are accomplished by providing an excitation circuit excited with a current or potential whose frequency is a harmonic of the fundamental frequency applied to the converter. This frequency should be such that it has voltage peaks symmetrically disposed with the voltage peaks of an alternating current supplied to the converter. For instance when three-phase potential is applied to the converter, we have found that a third harmonic is particularly adapted for service as a make-alive potential.

According to our invention the third harmonic potential is applied to a common supply circuit to all of the make-alive electrodes, and the application to individual make-alive electrodes controlled by means of suitable grid-controlled valves, the grids of which are, in turn, controlled by the potential applied to the converter.

The third harmonic potential may be secured by several different methods. Where the converter operates by means of an inter-phase transformer, such as that utilized in double three-phase operation, the harmonic potential may be derived from the interphase transformer, or if desired, the harmonic potential may be developed from an auxiliary transformer having its secondary connected in open delta. The open delta potential may be used directly or amplified as desired by a suitable transformer.

Figure 2:
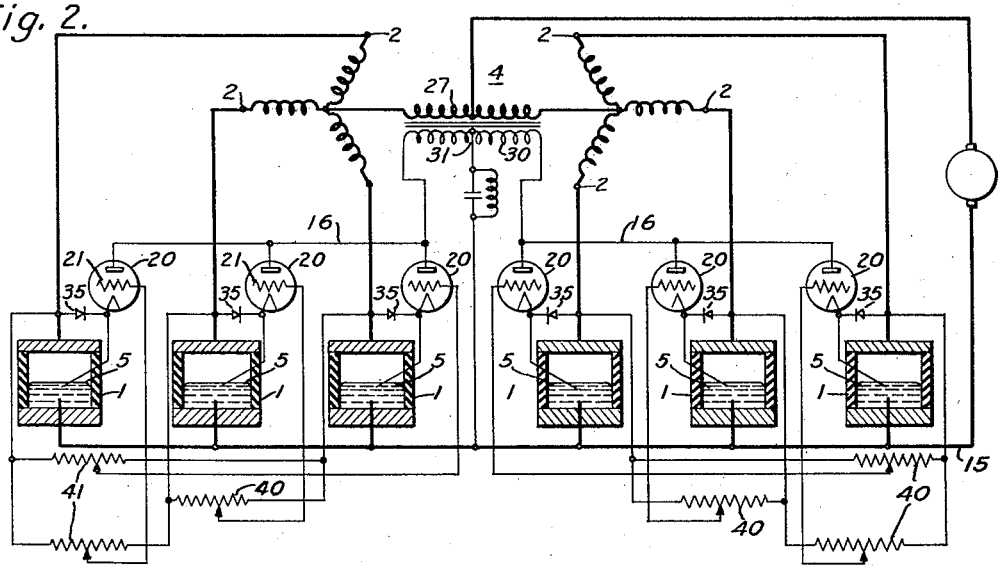

Other objects and advantages will be apparent from the following detailed description, taken in conjunction with the accompanying drawings, in which:

Figure 1 is a schematic illustration of a preferred embodiment of our invention utilizing an auxiliary transformer to produce the desired harmonic potential, Fig. 2 is a modification showing a method of securing the excitation voltage from the inter-phase transformer, Fig. 3 is a similar modification showing auxiliary means for applying make-alive potential when no current is flowing in the interphase transformer, Fig. 4 is a similar view showing the direct application of the open delta potential to the make-alive circuit, and Fig. 5 is a schematic illustration of an auxiliary control valve switch for use in the excitation system.

In the preferred embodiment of our invention as shown in Fig. 1 the converter comprises a plurality of substantially independent valve elements 1 of the make-alive type connected to the six phase-terminals 2 of the secondary of a suitable rectifier transformer 4 herein shown as a double three-phase connection. Each of the main valves 1 is provided with a suitable make-alive electrode 5 which is supplied with potential from an excitation transformer 10, which is, in turn, supplied with a third harmonic potential from a suitable auxiliary transformer 11 having an open delta secondary winding 12.

While we prefer to use an auxiliary transformer 11 to provide this harmonic potential, it is, of course, possible to supply the third harmonic potential from a tertiary winding (not shown) in the main transformer 4.

The excitation transformer 10 is provided for a mid-tap 14 which is connected to the common direct current connection 15 to the make-alive valves 1. The harmonic potential is applied to a suitable make-alive bus 16 to which all of the make-alive electrodes 5 are connected. In order to apply make-alive potential only to the desired make-alive electrode 5, grid controlled valves 20 are inserted between the make-alive bus 16 and the make-alive electrodes 5. The grids 21 of these auxiliary valves 20 are in turn controlled by the potential applied to the converter. If desired, the grids 21 could be directly connected to the anode of the valve 1 which it is desired to control, however we prefer to connect this grid 21 to the phase immediately preceding the phase to be controlled. In this manner the grid 21 of the auxiliary tube 20 can be released at the time in the conducting half cycle when the anode potential of the converter valve being controlled becomes positive.

In the modification according to Fig. 4, the excitation transformer 10 has been dispensed with and the open delta potential applied directly to the excitation bus 16, and an artificial neutral 24 provided by suitable means such as capacitors 25 and resistors 26. This neutral 24 is connected to the cathode lead 15 of the converter in the same manner as the midpoint of the excitation transformer 10 according to the modification of Fig. 1.

In the operation of the system according to Figs. 1 and 4, the application of three-phase potential to the system produces a third harmonic output in the open delta winding 12 of the excitation source. This third harmonic potential is impressed directly on the excitation system, but is prevented from reaching the make-alive electrodes 5 by the auxiliary grid controlled valves 20. However, the potential applied to the phase terminals 2 of the converter transformer is, in turn, applied to the grids 21 of the auxiliary valves 20. Since no current is at this time flowing in the interphase transformer 27, the transformer voltage is substantially six phase diametrical, so that one phase of the main transformer will be sufficiently positive to release a grid 21 in one of the auxiliary tubes 20. The releasing of this grid 21 allows current to flow to a make-alive electrode 5 which, in turn, creates a cathode spot and permits current to flow in the converter valve 1. In like manner the grids of all of the valves 20 will be released in turn, since the third harmonic potential applied to the valves 20 has a periodicity much less than the potential applied to the main transformer. The current will flow in the make-alive electrode only for this short period of time. At the end of this period the current in the make-alive electrode 5 will cease to flow. Since the third harmonic potential is applied to the make-alive circuit, the next impulse will be applied to the make-alive bus 16 at a period sufficiently late that the potential of the main transformer 4 will have advanced to a succeeding phase, consequently the original valve 20 will be blocked and current will not again flow through the make-alive electrode 5 associated with that phase until the controlling phase of the main transformer 4 is again positive.

In the modification according to Fig. 3, the third harmonic potential is derived directly from a winding 30 associated with the interphase transformer 27 of the three-phase system. For purposes of illustration, we have shown a main transformer 4 having its phase terminals directly connected to the cathodes of the make-alive valves 1 while the anodes supply the common connection to the converter. The excitation winding 30 has a midpoint 31 connected to this common connection and the control valves 20 are directly connected to the anodes of the main converter valves 1. According to this modification, there will be no harmonic make-alive potential in the auxiliary winding 30 until current starts to flow in the interphase transformer 27. However, the common connection 31 from the excitation winding 30 to the anodes of the converter will supply the full phase potential of the main transformer 4 from the cathodes of the converter valves 1 to the anodes of the make-alive control valves 20. This potential will be sufficient to cause make-alive current to flow through the excitation winding 30 and create a cathode spot on one of the main converter valves and initiate current flow in the interphase transformer 27, which will thereafter generate the harmonic potential in the interphase winding.

When the grid 21 of the control valves 20 are directly connected to the valves 1 it is necessary to use special positive control valves in which the grid potential must be positive by an amount greater than the arc drop in the valve 1 in order to prevent the make-alive becoming operative on recurrent harmonic peaks while the anode of the main valve is positive. Also the same result may be obtained by inserting a negative bias between the main anode and the control grid.

In the modification according to Fig. 2, the main transformer 4 is connected to the anodes of the main converter valves 1 and the excitation winding 30 associated with the interphase transformer 27. In this modification the auxiliary potential desired to initiate current flow in the make-alive circuit 16 when no load current is flowing in the winding 27 is derived directly from the anodes of the valves 1 by means of auxiliary rectifiers 35 in parallel with the controlled valve 20 of the make-alive circuit.

While we prefer to provide each phase of the converter with this auxiliary rectifier 35, in practice it may be desirable to provide this auxiliary rectifier on only one or two of the main converter valves 1. While the grids 21 of the make-alive control tubes 20 may be directly excited from the anode of the phase being controlled, we prefer to control this grid with a leading potential derived from the next preceding phase as shown in Fig. 1 by means of a composite potential derived from the phase being controlled and the preceding phase with which it commutates. This control potential may be secured by connecting a suitable resistor 40 across the phase terminals 2 involved.

While we have shown independent valves 20 and 35 for supplying the make-alive current, it is desirable to incorporate both valves in a single envelope as shown in Fig. 5. Only the anode connected to the excitation circuit 16 is grid controlled, the auxiliary valve 35 being uncontrolled and effective only to initiate current flow to the make-alive electrode 5 when the excitation circuit is inactive. This result being inherent in the device because the valve 35 can only carry current when the potential across the valve 1 has increased to a value sufficient to cause current flow though the valve 35 and the resistance of the make-alive electrode 5.

While we have shown and described specific modifications of our invention, it will be apparent that changes and modifications can be made therein without departing from the true spirit of our invention or the scope of the appended claims.

We claim as our invention:

1. An electrical conversion system comprising an alternating current line, a direct current line, a make-alive type converter for transferring energy between said lines, a double three-phase transformer for connecting the converter to the alternating current line, an auxiliary winding associated with said transformer for producing a potential having a frequency which is a third harmonic of the alternating current frequency and means responsive to the potential of said transformer for periodically impressing said harmonic potential on the make-alive electrodes in isochronous relation to the application of potential to the converter.

2. An electrical conversion system comprising an alternating current line, a direct current line, a make-alive type converter for transferring energy between said lines, a double three-phase transformer for connecting the converter to the alternating current line, an auxiliary winding associated with said transformer for producing a potential having a frequency which is a third harmonic of the alternating current frequency, electric valves for successively impressing said harmonic potential on the make-alive electrodes, and auxiliary means for supplying potential to the make-alive electrode.

3. An excitation system for a double three-phase vapor-electric converter having valves of the make-alive type fed by a transformer having an interphase winding, comprising a winding associated with the interphase winding of the converter, means including grid controlled valves for sequentially impressing the potential of the winding on the make-alive electrodes of the converter, means responsive to the potential applied to the converter for controlling the grids of the grid controlled valves in sequence with the application of positive potential to the valves of the converter and a connection to said winding to supply make-alive potential when no load current is flowing in said interphase winding.

4. An electrical conversion system comprising a three-phase alternating current line, a direct current line, a vapor-electric converter having six substantially independent valves for transferring energy between said line, a transformer for connecting said valves to the alternating current line, a make-alive electrode in each of said valves, a third harmonic generator, said harmonic generator being connected to said make-alive electrodes, a grid controlled valve in series with each of said make-alive electrodes and means responsive to the voltage applied to the converter valves for controlling said grid controlled valves in sequence with the application of positive potential to the valves of the converter.

5. A vapor-electric rectifier system comprising a three-phase supply line, a direct current load system, a transformer connected to said alternating current system, said transformer having six phase terminals, a vapor-electric converter having substantially independent valves connected to said phase terminals and to said load system, a make-alive electrode in each of said valves, a source of third harmonic potential comprising an open delta winding energized inductively from said alternating current source, means including grid controlled auxiliary valves for successively connecting said harmonic potential to said make-alive electrodes isochronously with the application of positive potential to the converter valves.

6. A vapor-electric rectifier system comprising a three-phase supply line, a direct current lead system, a transformer connected to said alternating current system, said transformer having six phase terminals, a vapor-electric converter having substantially independent valves connected to said phase terminals and to said load system, a make-alive electrode in each of said valves, a source of third harmonic potential comprising an open delta winding energized inductively from said alternating current source, means including grid controlled auxiliary valves for connecting said harmonic potential to said make-alive electrodes, and means responsive to the potential applied to said converter valves for controlling the grids of said auxiliary valves for successively applying potential to said make-alive electrodes in isochronous relation to the application of positive potential to the valves of the converter.

7. An excitation system for a polyphase vapor-electric converter having a plurality of single anode, single cathode valves comprising a make-alive electrode in each of said valves, a source of harmonic current and means for successively connecting said harmonic current to said make-alive electrodes.

8. An electric conversion system comprising a transformer having six phase terminals, six make-alive type valves connected to said phase terminals, a make-alive electrode in each valve for controlling the conductivity thereof, a source of triple harmonic potential comprising an open delta winding, an exciting transformer fed from said source connections for impressing the potential of said exciting transformer on the make-alive electrodes, said connections comprising grid controlled valves in series with each make-alive electrode, each of said grids being controlled from a phase of the converter other than that with which it is associated.

9. An electric conversion system comprising a transformer having six phase terminals, a six valve converter connected thereto, a make-alive electrode in each valve for controlling the conductivity thereof, a source of triple harmonic potential comprising an open delta winding, an exciting transformer fed from said source connections for impressing the potential of said exciting transformer on the make-alive electrodes, said connections comprising grid controlled valves in series with each make-alive electrode, and means for impressing a potential on said grids, said potential being out of phase with, but of the same frequency as, the potential applied to the converter valve with which the grid control valve is associated.

10. An excitation system for a polyphase vapor-electric converter of the make-alive type comprising a make-alive valve for each phase of the converter, a make-alive electrode associated with each valve, a transformer for supplying current to said valves, an interphase winding in said transformer, a winding associated with said interphase winding, means including grid controlled valves for successively impressing the potential of said winding on the make-alive electrode, and means responsive to the potential applied to the make-alive valves for controlling the grids of the grid controlled valves for applying the potential of said winding to said make-alive electrodes in sequence with the application of positive potential to the make-alive valves.

DANIEL SILVERMAN.
     LEON R. LUDWIG.